US008326666B2

(12) United States Patent
Caldwell et al.

(10) Patent No.: US 8,326,666 B2

(45) Date of Patent: Dec. 4, 2012

(54) EVENT SYNCHRONIZED REPORTING IN PROCESS CONTROL SYSTEMS

(75) Inventors: John M. Caldwell, Austin, TX (US); Christopher J. Felts, Austin, TX (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 1004 days.

(21) Appl. No.: 12/240,948

(22) Filed: Sep. 29, 2008

(65) Prior Publication Data

US 2010/0082396 A1 Apr. 1, 2010

(51) Int. Cl.
*G06Q 10/00* (2012.01)

(52) U.S. Cl. ............... 705/7.12; 705/2; 705/16; 705/30; 705/32; 703/13; 703/17; 706/25; 358/1.14

(58) Field of Classification Search ........................ None
See application file for complete search history.

(56) References Cited

U.S. PATENT DOCUMENTS 5,134,574 A 7/1992 Beaverstock et al.
5,590,269 A 12/1996 Kruse et al.
5,661,653 A 8/1997 Kulik
5,768,119 A 6/1998 Havekost et al.
5,835,898 A 11/1998 Borg et al.
6,081,797 A * 6/2000 Hittt ................................ 706/25
6,760,687 B2 7/2004 Apel et al.
6,862,486 B2 3/2005 Cocco et al.
6,928,646 B1 * 8/2005 James et al. .................. 718/104
7,155,450 B2 12/2006 Pepper et al.
7,221,988 B2 5/2007 Eryurek et al.
7,249,356 B1 7/2007 Wilson et al.
7,302,307 B1 * 11/2007 Anderson et al. ............. 700/121
7,379,782 B1 5/2008 Cocco et al.
7,398,187 B2 7/2008 Tinseth
7,522,639 B1 * 4/2009 Katz ............................. 370/503
7,569,818 B2 * 8/2009 Schmid et al. ................ 250/310
(Continued)

FOREIGN PATENT DOCUMENTS

WO WO-03/007197 A1 1/2003
(Continued)

OTHER PUBLICATIONS

Godding, G.. A multi-modeling approach using simulation and optimization for supply-chain network systems. Ph.D. dissertation, Arizona State University, United States—Arizona.*

(Continued)

*Primary Examiner* — Gurkanwaljit Singh
(74) *Attorney, Agent, or Firm* — Marshall, Gerstein & Borun LLP

(57) ABSTRACT

Methods, systems, and computer-executable instructions for event synchronized reporting in an process control system are disclosed. Events may be synchronized by a synchronization parameter, whose instances of occurrence may be non-contiguous in time. Examples of synchronization parameters may include a work shift, a work group, an individual's on-duty time, a logged-on period of an individual, the execution times of a process control entity, a batch run type, and a procedure or sub-unit of a batch run. Instances of occurrence of the synchronization parameter may be recorded into a process control event database. Event synchronized reports may contain at least one synchronization value based on both the instances of occurrence of the synchronization parameter as well as historical process control data. Data from various historian databases may be accessed from process control system tools and integrated into a single report.

20 Claims, 8 Drawing Sheets

U.S. PATENT DOCUMENTS

| | | | | |
|---|---|---|---|---|
| 7,840,285 | B2 * | 11/2010 | Wilson et al. | 700/11 |
| 7,865,383 | B2 * | 1/2011 | Tafoya | 705/7.36 |
| 7,941,188 | B2 * | 5/2011 | Jung et al. | 455/562.1 |
| 8,041,996 | B2 * | 10/2011 | Rathunde et al. | 714/26 |
| 8,140,369 | B2 * | 3/2012 | Paul et al. | 705/7.14 |
| 2002/0091972 | A1 * | 7/2002 | Harris et al. | 714/47 |
| 2002/0099592 | A1 * | 7/2002 | Donahue | 705/10 |
| 2003/0231332 | A1 * | 12/2003 | Barrett | 358/1.14 |
| 2004/0088232 | A1 * | 5/2004 | Minnis, Jr. | 705/30 |
| 2004/0153437 | A1 | 8/2004 | Buchan | |
| 2004/0176864 | A1 | 9/2004 | Cocco et al. | |
| 2004/0186927 | A1 | 9/2004 | Eryurek et al. | |
| 2004/0230508 | A1 * | 11/2004 | Minnis et al. | 705/35 |
| 2005/0004781 | A1 | 1/2005 | Price et al. | |
| 2005/0031358 | A1 * | 2/2005 | Barrett | 399/9 |
| 2005/0038543 | A1 * | 2/2005 | Lin et al. | 700/108 |
| 2005/0038749 | A1 * | 2/2005 | Fitch et al. | 705/51 |
| 2005/0114089 | A1 | 5/2005 | Celestini | |
| 2005/0144154 | A1 | 6/2005 | DeMesa et al. | |
| 2005/0160084 | A1 * | 7/2005 | Barrett | 707/3 |
| 2005/0182698 | A1 | 8/2005 | Garcia et al. | |
| 2006/0122812 | A1 | 6/2006 | Tinseth | |
| 2007/0038889 | A1 | 2/2007 | Wiggins et al. | |
| 2007/0142941 | A1 | 6/2007 | McGreevy et al. | |
| 2007/0192128 | A1 | 8/2007 | Celestini | |
| 2007/0211079 | A1 | 9/2007 | Nixon et al. | |
| 2007/0244571 | A1 * | 10/2007 | Wilson et al. | 700/11 |
| 2007/0299720 | A1 * | 12/2007 | Tafoya | 705/11 |
| 2008/0307525 | A1 * | 12/2008 | Nickle | 726/22 |
| 2009/0112939 | A1 * | 4/2009 | Sanghvi et al. | 707/201 |
| 2009/0171706 | A1 * | 7/2009 | Bobak et al. | 705/7 |
| 2009/0183023 | A1 * | 7/2009 | Rathunde et al. | 714/4 |
| 2009/0192778 | A1 * | 7/2009 | Gabele et al. | 703/17 |
| 2010/0049574 | A1 * | 2/2010 | Paul et al. | 705/9 |

FOREIGN PATENT DOCUMENTS

WO WO-03/058486 A1 7/2003

OTHER PUBLICATIONS

Mojahed, Shahriyar (2005). A project improvement system for effective management of construction projects. Ph.D. dissertation, Louisiana State University and Agricultural & Mechanical College, United States—Louisiana.*

Kai Reimers. (2004). GEARBOX (China) Ltd.: will the company's ERP system support its ambitious growth strategy? Journal of Information Technology, 19(2), 140-148.*

Extended European Search Report for Application No. 09171465.9, dated Dec. 29, 2009.

Great Britain Search Report for Application No. GB0914884.2, dated Nov. 17, 2009.

European Office Action for Application No. 09171465.9 dated May 6, 2011.

Philippine Office Action for 12009000268 mailed Jan. 27, 2012.

Great Britain Examination Report for Application No. GB0914884.2, dated Mar. 8, 2012.

* cited by examiner

Acme Refining Company
FCC Operations Shift Analysis Report

Start: 9/1/07 12:00 AM
End: 10/1/07 12:00 AM

| | Shift Work Groups | | | | |
|---|---|---|---|---|---|
| | Team A | Team B | Team C | Team D | Team E |
| Feed Rate (MBPD) | 103.2 | 104.5 | 101.8 | 108.3 | 105.2 |
| Conversion (%) | 78.2 | 78.0 | 78.6 | 77.2 | 77.9 |
| Rx Temp (degF) | 990.0 | 989.9 | 990.4 | 987.6 | 989.1 |
| Yields (%) | | | | | |
| -Naptha | 28.3 | 28.3 | 28.5 | 28.0 | 28.2 |
| -Kero | 20.5 | 20.5 | 20.6 | 20.3 | 20.5 |
| -Jet | 8.1 | 8.1 | 8.2 | 8.0 | 8.1 |
| -LCGO | 14.1 | 14.1 | 14.2 | 13.9 | 14.1 |
| -HCGO | 7.1 | 7.1 | 7.1 | 7.0 | 7.1 |
| -Resid | 21.8 | 22.0 | 21.4 | 22.8 | 22.1 |
| # Critical Alarms | 16 | 12 | 21 | 34.0 | 27.0 |
| # Emissions Violations | 0 | 0 | 1 | 2 | 0 |
| Control Utilization (%) | 94.2 | 96.1 | 99.2 | 88.4 | 93.4 |
| Shift Task completion (%) | 100.0 | 100.0 | 84.0 | 92.0 | 100.0 |
| # Device Failures | 1 | 0 | 2 | 3.0 | 0 |

EVENT SYNCHRONIZED REPORTING IN PROCESS CONTROL SYSTEMS

FIELD OF THE DISCLOSURE

The present disclosure generally relates to reporting events in a process control system, and in particular, to synchronized reporting of events that occur over non-contiguous time intervals in a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital busses. The field devices, which may be, for example, valves, valve positioners, switches and transmitters (e.g., temperature, pressure and flow rate sensors), perform functions within a process such as opening or closing valves and measuring process parameters. The process controllers receive signals indicative of process measurements made by the field devices and/or other information pertaining to the field devices, use this information to implement a control routine, and then generate control signals that are sent over the busses or other communication lines to the field devices to control the operation of the process. In this manner, the process controllers may execute and coordinate control strategies using the field devices via the busses and/or other communication links communicatively coupling the field devices.

Process control system applications typically include process control monitoring routines that can be configured to monitor various aspects of a process control system and to log information associated with monitoring the process control system. For example, monitoring routines are often used to monitor alarms associated with various field devices, modules, plant areas, etc. and to collect detailed information (e.g., instance/condition counts, time of day, acknowledged/unacknowledged status, duration, etc.) associated with the alarm. Monitoring routines may also be used to monitor other aspects of a process control system such as, for example, events, actions, errors, etc. The collected detailed information (i.e., process control log information) is typically stored in one or more centralized databases.

In a process control plant using a process control system, operating personnel and/or other process control plant personnel typically need access to the vast amounts of stored process control log information in order to safely and profitably operate the process control plant. Typically, users retrieve this information using, for example, data queries of the one or more databases in the process control system. The accessed data may be formatted into reports and displayed on a screen of a user interface, saved as a file, sent to another location, printed, or otherwise communicated or stored.

Often, operating personnel may desire to view data and information for related, non-contiguous time periods, for instance, data and information related to work teams, work shifts, or work groups. For example, operating personnel may wish to know the number of high temperature events that occurred during Team A's work shifts last month. In another example, operating personnel may wish to compare yield rates and number of tasks completed for different shifts.

In addition to personnel related information, users may with to determine information for other types of related, non-contiguous time periods. For example, a user may with to determine when Product XYZ was being produced last week. Other examples may include the number of failures for valves of type N in the last year, the average production rate, the percentage yield for a particular batch run type over the last year, and other such types of information.

Operating and other personnel, however, often encounter difficulty in trying to collect, consolidate and view report information over non-contiguous time periods of interest, especially in an easily obtained and meaningful manner. Frequently, the desired information is scattered across various databases and reports, sometimes even external to the process control system itself. For example, consider the case of viewing historical plant data associated with a particular team's work shifts. Most plants implement rotating shift schedules, where the varying start and stop times of the rotating shifts make it difficult and cumbersome to identify who was working at what time. Shift schedules may be incorporated into a human resources database which is independent of the process control plant system, and must be manually aggregated with historical process control data. Operating personnel may have difficulty in obtaining aggregate, average, percentage and/or total information over multiple, non-continuous time intervals given the inconsistent shift schedules and the disparately located data.

In fact, most control system reports, work shift-based or otherwise, are based on fixed time periods, relative time periods or scheduled time periods. If events of interest do not conform to the report time period structure, difficulty in identifying accurate time periods and adjusting report calculations may surface. Plant personnel are frequently forced to employ unwieldy, multi-step, manual data and report consolidation procedures in order to obtain desired data and information for multiple, non-contiguous time intervals.

SUMMARY OF THE DISCLOSURE

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure provides embodiments of a method for reporting synchronized events in a process control system, and in particular, reporting synchronized events in a process control system that occur over non-contiguous time periods or intervals. The method may include obtaining a synchronization parameter that has multiple, non-contiguous instances of occurrence. Synchronization parameters may be, for example, a scheduled work shift, on-duty time intervals of a work group, on-duty time intervals for an individual, a period of time that an individual is logged on to one or more computers of the process control system, an execution time interval of a physical or logical entity in the process control plant, one or more batch runs of a certain type, and other such parameters occurring over multiple, non-contiguous time intervals in a process plant.

The method may include extracting events (and/or data associated therewith) corresponding to instances of occurrence of the synchronization parameter from one or more centralized databases of the process control system, such as an event historian database, a continuous history database, a batch historian database, or other types of databases. The extracted data and information may then be used to generate an event synchronized report for the synchronization parameter.

In some embodiments of the method, historical data corresponding to continuous process information may be extracted from, for example, a continuous historian database. The event synchronized report may extract data values or information from continuous process data that transpired during the instance(s) of occurrence of the synchronization parameter. The extracted historical data may then be combined over the instance(s) of occurrence to obtain a synchronization value. The synchronization value may be, for example, an aggregate value, an average value, total values, a percentage, and the like. Similarly, discrete event historical data and/or batch historical data may also be used to determine a synchronization value.

Some embodiments of the method may include incorporating the synchronization parameter itself into a process control system database to enable data extraction. For example, the synchronization parameter may be defined as a process control event or object in the process control system. An event may be generated and recorded into a centralized database at the start of a synchronization parameter instance, and another event may be generated and recorded at the finish of the synchronization parameter instance.

The present disclosure provides embodiments of an event synchronized reporting system in a process control system of a process control plant. The event synchronized reporting system may include a computer of the process control system, a historian database of the process control system, and an event synchronizer stored on and executable by the computer. The event synchronizer may obtain a synchronization parameter having multiple instances of occurrence over non-contiguous time intervals, and may generate and record events corresponding to the synchronization parameter (e.g., start times of instances of occurrence, end times of instances of occurrence, and other events). The event synchronizer may generate event synchronized reports corresponding to the synchronization parameter including historical discrete, continuous and/or batch process information that transpired during the instances of the synchronized parameter. For instance, aggregate values based on the historical information, average values, total values, percentages, and the like may be presented on the event synchronized reports. Generated event synchronized reports may be bounded by a specified time interval, during which one or more instances of occurrence of the synchronization parameter may have taken place.

The present disclosure also provides embodiments of a method for synchronizing work shift information in a process control system. The method may include identifying a work shift, generating events at the beginnings and the ends of each work shift instance, recording the events, and generating an event synchronized report for the work shift. Work shifts may include various levels of personnel identification, such as the identification of a work shift, a work group, an individual, or logged-on instances of a particular individual. Alternatively or additionally, work shifts may include “working” shifts of various process control entities within the process control plant, such as when a particular physical piece of equipment is running or being used, or when a specific batch type is run. An event synchronized report may report on more than one type of work shift. For example, an event synchronized report may contain a total number of alarms occuring on a specific type of equipment for a specific work group during the last quarter.

The present disclosure describes a computer-readable storage medium in a process control system of a process control plant having computer executable instructions thereon for performing steps of obtaining work shift information corresponding to a work shift in the process control plant. The work shift information may be obtained, for example, via a user interface or from a local or remote database. Further computer executable instructions may perform the step of storing the work shift information, generating work shift events for each instance of occurrence of the work shift, and recording the work shift events in a centralized database of the process control system, such as a historian database.

Further computer executable instructions may perform the step of retrieving work shift information from the centralized database, and combining historical event, continuous process, and/or batch information that occurred during the work shift to produce an event synchronized report. The computer executable instructions may also include a user interface for receiving input data and for displaying the generated report.

Synchronized event reports generated by embodiments of the methods and systems of the present disclosure may be limited to report information associated with events occurring during an overall time interval containing a portion of (but not all) instances of a work shift. Synchronized event reports may be configured to be automatically generated, for instance, by a scheduling process in the process plant control system. Pre-defined or ad hoc synchronized event reports may be generated per a user’s request. Additionally, a user may be able to manually define a new event synchronized report and generate the new report at any time.

DETAILED DESCRIPTION

Although the following describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

Figure 1:
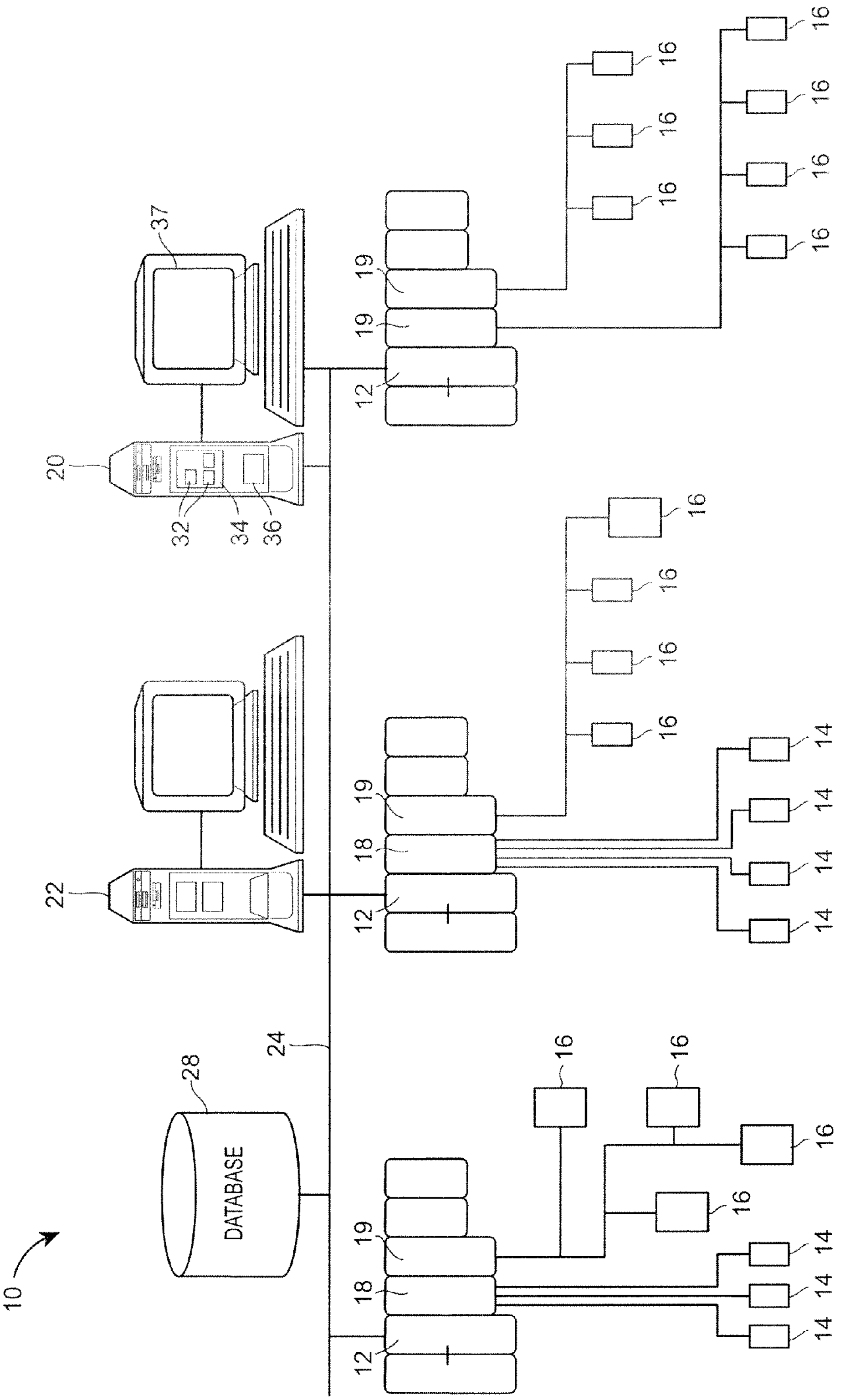
FIG. 1 is a block diagram of an exemplary distributed process control system in a process control plant.

Referring now to FIG. 1, a process plant 10 includes a distributed process control system having one or more process controllers 12, which may be a pair of redundant controllers. Each process controller 12 is connected to one or more field devices 14 and 16 via input/output (I/O) cards or devices 18 and 19, which may be any types of I/O devices conforming to any desired communication or controller protocol. The field devices 14 and 16 may be any types of field devices such as, for example, sensors, valves, transmitters, positioners, etc., and may conform to any desired open, proprietary, or other communication or programming protocol.

The process plant 10 also includes one or more host workstations, computers, or user interfaces 20 and 22 (which may be any type of personal computers, workstations, etc.) that are accessible by plant personnel such as configuration engineers, process control operators, maintenance personnel, etc. The user interfaces 20 and 22 are coupled to the process controllers 12 via a communication line or bus 24. The communication bus 24 may be implemented using any desired hardwired or wireless communication structure, and using any desired or suitable communication protocol such as, for example, an Ethernet protocol. The process controllers 12, the I/O devices 18 and 19, and the field devices 14 and 16 generally make up the process control system.

In addition, a database 28 may be connected to the communication bus 24, and operates as a data historian that collects and stores parameter, status and other data associated with the process controllers 12 and field devices 14 and 16 within the plant 10. Alternatively, or in addition, the database 28 may operate as a configuration database that stores the current configuration of the process control system within the plant 10 (and configuration data related thereto) used by the process controllers 12 and the workstations 20, 22. The database 28 may also serve as a data historian by collecting and storing data generated in the process plant 10 for future use. Although FIG. 1 illustrates only one database 28, multiple databases are possible, such as an event historian database and a continuous process historian database.

While the process controllers 12, the I/O devices 18 and 19 and the field devices 14 and 16 are typically located down within and distributed throughout the sometimes harsh plant environment, the user interfaces 20 and 22 and the database 28 are usually located in control rooms or other less harsh environments easily assessable by operators or maintenance personnel.

As is known, each of the process controllers 12, which may be for example, the DeltaV™ controller sold by Emerson Process Management, stores and executes a controller application that implements a control strategy using a number of different, independently executed control modules or blocks. The control modules may each be made up of what are commonly referred to as function blocks. Each function block is a part or a subroutine of an overall control routine and operates in conjunction with other function blocks (via communications called links) to implement process control loops within the process plant 10.

As is well known, function blocks, which may be objects in an object-oriented programming protocol, typically perform one of an input function, such as that associated with a transmitter, a sensor or other process parameter measurement device, a control function, such as that associated with a control routine that performs PID (proportional, integral and derivative) control routines, fuzzy logic, etc. control, or an output function, which controls the operation of some device, such as a valve, to perform some physical function within the process plant 10. Of course, hybrid and other types of complex function blocks exist such as model predictive controllers (MPCs), optimizers, etc. While the Fieldbus protocol and the DeltaV system protocol use control modules and function blocks designed and implemented in an object-oriented programming protocol, the control modules could be designed using any desired control programming scheme including, for example, sequential function blocks, ladder logic, etc., and are not limited to being designed using function blocks or any other particular programming technique.

In the process plant 10 illustrated in FIG. 1, the field devices connected to the process controllers 12 may be conventional (i.e., non-smart) field devices 14 such as, for example, standard 4-20 mA devices that communicate over analog or combined analog and digital lines to the I/O device 18. Alternatively or in addition, the field devices may be smart field devices 16 having a processor and a memory such as, for example, FOUNDATION® Fieldbus field devices that communicate over a digital bus to the I/O device 19 using Fieldbus protocol communications. Smart field devices 16 may store and execute modules, or sub-modules such as function blocks associated with the control strategy implemented in the controllers 12. Function blocks, which may be disposed in two different ones of the Fieldbus field devices 16, may be executed in conjunction with the execution of the control modules within the process controllers 12 to implement process control, as is well known. Of course, the field devices 14 and 16 may be any types of devices, such as sensors, valves, transmitters, positioners, etc. and the I/O devices 18 and 19 may be any types of I/O devices conforming to any desired communication or controller protocol such as HART, Fieldbus, Profibus, etc.

In the process plant 10 of FIG. 1, the workstation 20 (which may be, for example, a personal computer) may be used by one or more operators to design the process control modules to be executed by the process controllers 12, and display routines to be executed by the workstation 20 (or other computers), and to communicate with the process controllers 12 so as to download such process control modules to the process controllers 12. Furthermore, the workstation 20 may execute display routines that receive and display information pertaining to the process plant 10 or elements thereof during operation of the process plant 10.

The workstation 20 includes a memory 34 for storing a plurality of applications 32 such as, for example, configuration design applications and user interface applications, and for storing data such as, for example, configuration data pertaining to the configuration of the process plant 10 and other data structures 32, which may be accessed by any authorized user (referred to herein as an operator) to view and provide functionality with respect to devices connected within the process plant 10.

While the entire plurality of data source applications 32 is illustrated as being stored in only one workstation 20, some of these data source applications 32 or other entities could be stored in and executed in other workstations or computer devices within or associated with the plant 10 such as, for example, workstation 22. Still further, the plurality of data source applications 32 may be located in different geographical locations from each other and/or the process plant 10, and adapted to communicate via any suitable communication network such as, for example, the Internet, or other private or open network.

The workstation 20 also includes a processor 36 that executes the plurality of applications 32 to enable an operator to design process control modules and other routines, and to download these process control modules to the process controllers 12 (or to other computers), or to collect and display information via display screen 37 from other data source applications 32 to the operator during operation of the process plant 10.

The present disclosure generally relates to synchronized reporting of events that occur over non-contiguous time intervals in a process control system. The synchronized reporting may be based on a synchronization parameter that corresponds to an entity contained within the process control system, such as the run time of a specific process control object. In another example, the synchronization parameter may correspond to an entity pertinent to but outside of the process control system, such as a schedule of a work shift. Events corresponding to the synchronization parameter may be stored as discrete process control events in a process control system historian database, similar to how traditional process control events are currently stored. For example, an event may be generated at the start of an instance of the synchronization parameter, and another event may be generated at the finish of the instance. The stored events for instances of the synchronization parameter may be subject to access and usage similar to traditionally stored process control events, including the ability to be searched, extracted, sorted, etc.

Furthermore, the present disclosure provides for integrating, for reporting purposes, the stored synchronization parameter events with traditional process control historian data. Traditional process control historian data may include continuous historian data, discrete historian data, batch historian data, or some combination thereof. Any traditional process control historian data or combinations of types of process control historian data may be able to be searched, and the pertinent data may be obtained and aggregated across multiple instances of occurrence of the synchronization parameter for display in a report. The searching of process control historian data may be bounded by attributes or fields associated with the stored synchronization parameter events, for example, time boundaries, tags, event types, descriptions, other fields, or combinations thereof. By storing synchronization parameter events within the process control system, this integration of synchronization parameter events and traditional historian data is easily accomplished.

The present disclosure provides several benefits that are missing from existing process control systems. First, the present disclosure provides for automatically aggregating data across non-contiguous time intervals. Existing process control systems typically report on a per instance or per time interval basis, and any aggregation of data across non-contiguous time intervals for a synchronization parameter must be done manually, if at all. Secondly, the present disclosure provides for incorporating events traditionally external to the process control system into its event historian database, thus allowing easy integration with traditional historian data. In existing process control systems, any integration of external events with historian data must also be manually retrieved and manually integrated with historian data. Finally, the present disclosure allows for integrating the synchronization parameter with historian data not only from one historian database, but from multiple historian databases. Existing process control systems do not provide this capability. With the present disclosure, a user of the process control system may easily obtain a comprehensive report that is synchronized not only across multiple time intervals but also across multiple historian databases.

Figure 2:
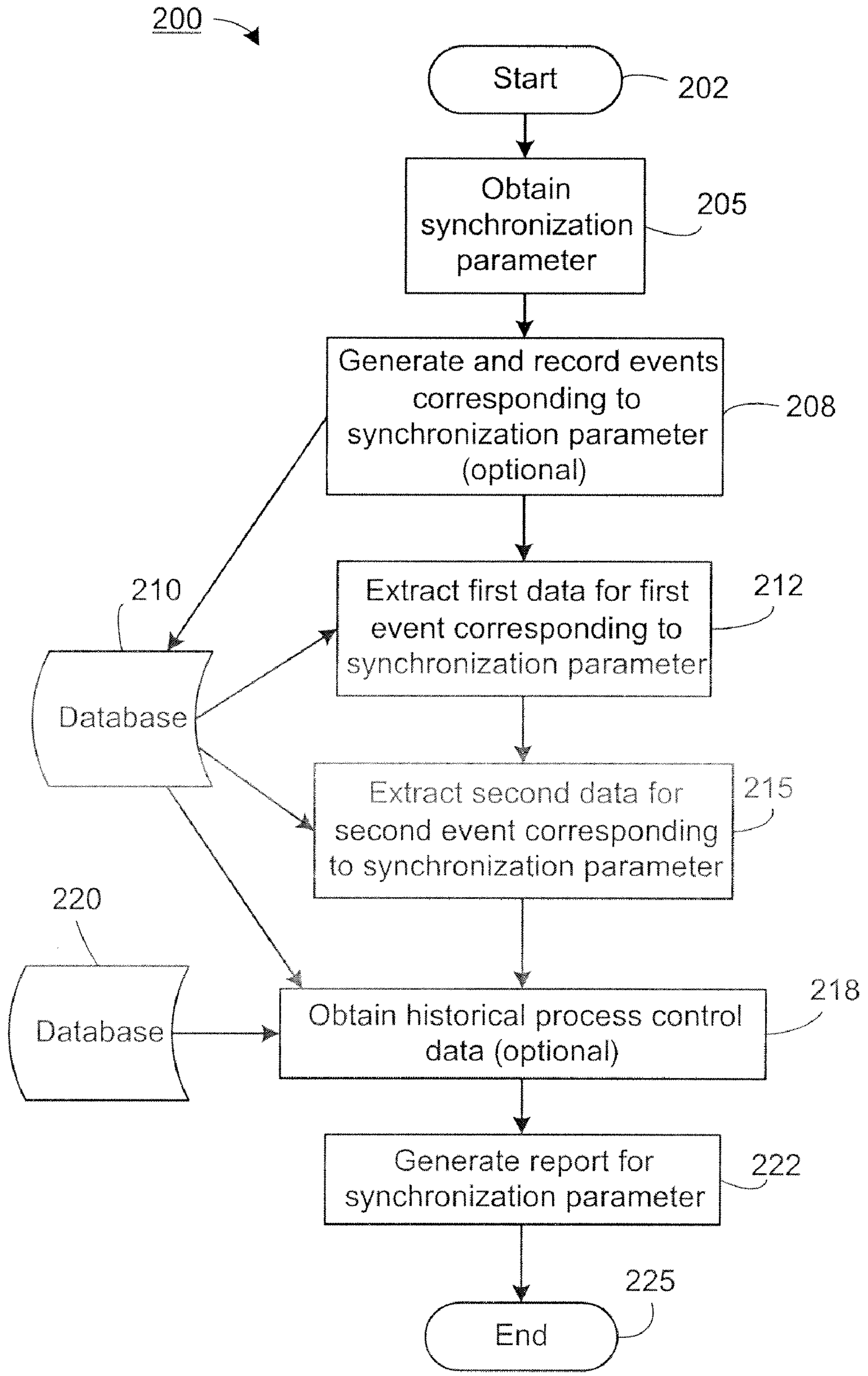
FIG. 2 illustrates an exemplary embodiment of a method for reporting synchronized events in a process control system.

FIG. 2 illustrates an exemplary embodiment of a method 200 for reporting synchronized events in a process control system of a process control plant. Embodiments of the method 200 may operate, for example, in accordance with embodiments of a process control system in the process plant 10 of FIG. 1. At the start (block 202) of the method 200, a synchronization parameter may be obtained (block 205). A synchronization parameter may be a parameter in the process control system or a parameter relating to some aspect of the process control plant. The synchronization parameter may manifest itself in one or more instances of occurrence, with each instance of occurrence transpiring over a measurable, defined amount of time. Each instance of occurrence of the synchronization parameter may or may not be contiguous with respect to time. For the purposes of this disclosure, however, at least one instance of occurrence is non-contiguous with at least one other instance of occurrence of the synchronization parameter.

One example of a synchronization parameter may be a work shift in a process control system. A work shift at a process control plant may have a start time, a stop time, and an assigned day of the week or date. Thus, each instance of the work shift may occur over non-contiguous blocks of time, e.g., 7 a.m. to 3 p.m. every week day, 12 hours on and 24 hours off, etc. Another example of a synchronization parameter may be a work group or team in a process control plant. A work group or team may be a group of individuals assigned to concurrently work together at the plant. A work group or team may be assigned to a specific work shift, or the team may split its on-duty time across various different time periods or shifts. For example, an IT group or team may be generally assigned to maintain the computers at a certain area of the process plant on a daily basis, but every other week the team may be assigned to take an overnight “on-call” shift.

Other levels of personnel groupings may also be synchronization parameters. For example, a particular individual’s on-duty work time may be a synchronization parameter, or the logged-on periods (at one computer, some, or any/all computers of the process plant control system) for a particular individual may be a synchronization parameter.

Synchronization parameters are not limited, however, to only personnel-related groupings. Any parameter associated with a process control system or a process control plant having multiple instances of occurrence (each of a measurable time duration, and with at least two instances being non-contiguous in time) may be considered to be a synchronization parameter. For example, a synchronization parameter may be the intervals of time where a specific physical process plant entity is running, e.g., a particular valve, a particular pump, a group of sensors, or other physical component or equipment of the process control system. A synchronization parameter may correspond to a non-physical process plant entity of the process control system, such as a software routine or a logical process control object. A synchronization parameter may be a batch process run of a particular type. A synchronization parameter may even correspond to some ancillary equipment of the process control plant, such as an air conditioning unit or a building security alarm system in the plant. Of course, other examples of synchronization parameters are possible.

At a block 208, events corresponding to the obtained synchronization parameter may be generated and recorded. To distinguish these events from other process plant events, a specific event type may be assigned for all events associated with a synchronization parameter (e.g., CHANGE-SHIFT or CHANGE-TEAM). In one embodiment of the block 208, a separate event may be generated at the start of an instance of occurrence, and a different event may be generated at the end of an occurrence. In other embodiments of the block 208, a single event may be generated to reflect a single instance of occurrence (start to finish) of the synchronization parameter. Events may include, for example, an event type, a timestamp, an identifier, a location, a description, a tag, and other such information. The generated events may be recorded in a database 210. The database 210 may be, for example, a historian database of the process control system, such as an discrete event historian database or may be any other type of database. The database 210 may be locally or remotely located.

Events corresponding to the synchronization parameter may be generated and recorded (at the block 208) in a similar fashion as known methods and systems used for generating and recording process control events in a process control system. The block 208 may operate in accordance with any such known methods and systems.

Note that, in some embodiments of the method 200, the block 208 may be optional. For example, if the synchronization parameter is fairly predictable, such as a regularly scheduled work shift, events corresponding to the work shift may be stored a priori into the database 210, and the block 208 may be omitted.

At a block 212, data corresponding to a first instance of occurrence of the synchronization parameter may be extracted, for instance, from the database 210. Alternatively or additionally, the data may be extracted from some other database (not shown), such as in embodiments when the block 208 is omitted. Similarly, at a block 215, data corresponding to a second instance of occurrence of the synchronization parameter that is non-contiguous in time with the first instance may be extracted from the database 210 or some other database. Although FIG. 1 shows the blocks 212 and 215 as extracting the first data and the second data from the same database 210, this is only one embodiment. Data corresponding to the first event or instance and data corresponding to the second event or instance may be obtained from different databases. In some embodiments, a database may even be external to the process plant control system, such as a human resources database.

At a block 218, historical process control data may be obtained from the same database 210 as the data extraction steps (215, 218), or from a different database 220. Historical process control data may correspond to any logical or physical process entity in the process control system, or may correspond to more than one logical or physical process entity in the process control system. Historical process control data may include continuous process control data, discrete event process control data and/or batch process data. Generally, in process control systems, continuous process control data may be stored in a continuous process historian database. Discrete event process control data may be stored in a discrete historian database, and batch process control data may be stored in a batch historian database. In some process control systems, however, one or more portions of one or more of these centralized, historian databases may be combined into the same database. The method 200 may operate in accordance with these and any other historian database architecture employed in process control systems. The block 218 may access any or all of these and other centralized databases in the process control system to obtain historical process control data.

Note that, in some embodiments of the method 200, the block 218 is optional. For example, if an event synchronized report that illustrates the number of times Team A worked last month is requested, the necessary information may be entirely obtained by the blocks 212 and 215. In at least this example, no additional historical process control information is required, and the block 218 may be omitted.

Next, an event synchronized report for the synchronization parameter may be generated (at a block 222). The event synchronized report may include at least one synchronized value based on the extracted first and the second event data, and the obtained historical data (if any). In this manner, the event synchronized report may provide a synchronized report across disparate instances of occurrence of the synchronized parameter. The generated report may be displayed on a screen or user interface of a device in connection with the process control system. The generated report may be printed and/or stored on or sent to another local or remote computer or other device internal or external to the process control system. Finally, at a block 225, the method 200 may end.

Some embodiments of the method 200 may employ varying degrees of user interface activities. For example, the synchronization parameter may be obtained at the block 205 via a user interface. Generating an event corresponding to the synchronization parameter (at the block 208) may incorporate obtaining some or all of the information associated with the event via user input. In some embodiments, the entire method 200 may be initiated at the block 202 in response to a user request for a particular report. In some embodiments, a user may be able to specify a report time interval, where only instances of occurrence of the synchronization parameter at least partially occurring during the specified report time interval are incorporated into the generation of the report (at the block 222). In some embodiments, a user may be able to specify one or more desired process control entities for which he or she wishes to see historical control process data (at the block 218) corresponding to instances of occurrence of the synchronization parameter. In some embodiments, a user may be able to specify one or more desired synchronization parameters for incorporation onto a single report. Other embodiments of the method 200 that employ one or more of these and other user interfaces may be possible.

Embodiments of the method 200 and other methods and systems of the present disclosure provide numerous benefits and advantages over available reporting mechanisms of process control systems. For example, most available process control system reports are based on pre-defined fixed time periods, relative time periods, or scheduled time periods. If events do not occur during the pre-defined periods or span across different pre-defined periods, a user must manually aggregate information across multiple reports to obtain the desired information. Embodiments of the present disclosure may utilize start and end events for each instance of occurrence, and thus enable a targeted extraction and reporting of desired information.

The present disclosure allows for consolidation of multiple time periods within a single report, for example, personnel-related groupings such as work shifts or work groups. Users normally would have to manually consolidate multiple time period information outside the process control system reporting tools. The present disclosure allows for consolidating data over multiple time periods within the existing process control system data access interface. In this case, no manual or external processing is required.

Furthermore, unlike most available process control system reporting tools, the present disclosure allows for the integration of different types of control history information using process control system tools. Any combination of continuous process control history, discrete event process control history, and/or batch processing history may be easily consolidated onto a single report. For example, both continuous history data and discrete event history data may be overlaid and aggregated on a single synchronized report.

The advantages of the present disclosure are clearly demonstrated through a few scenarios. The following examples are not meant to list every possible embodiment of the present disclosure, but merely provide an illustrative sampling of the benefits afforded by the present disclosure.

In a first example, a user may be able to directly access personnel information via the process plant control system rather than having to access a separate system to obtain the desired information. Consider a scenario in a process control plant in which an operator discovers that a certain operating procedure must be performed on a piece of faulty equipment at specific time intervals until a replacement arrives and is installed. Only those individuals who have received special training are qualified to perform the operating procedure. The operator may use the methods and systems of the present disclosure to easily determine if a qualified person is scheduled to work at each specified time interval. The operator is not forced to access to an external database, to call someone, or to take any action outside of the existing available control system interface, but simply may use the existing interface of the process control system.

In another example, a process plant employee may be concerned about a possible defect or performance issue for a certain type of device from a certain vendor. To help analyze the situation, the process plant employee may be able to use the methods and systems of the present disclosure to generate a report that shows the number of high alarms generated while such devices were executing or running versus the number of high alarms generated when a similar device from a different vendor was running over a same period of time. Additional historical data such as throughput at the devices and failure rates may also be added to the report. In this example, both discrete event history and continuous history may be reported in the same event synchronized report.

In yet another example, a process control plant supervisor may with to determine and compare the job performances across multiple teams. The supervisor may be able to generate a report for each team showing their average production rate, number of failures, number of tasks completed, etc. over a specified time period, and may even be able to combine this information for the multiple teams into a single report.

Obtaining or reporting other types of synchronized, aggregate information is also possible with the present disclosure. Examples may include, for instance, the average feed rate last quarter when a tower temperature was greater than 200° F., the number of times a specific override control kicked in during the processing of a certain batch type, or the quantity of Operator Changes that occurred when a certain work team was on duty in the last month.

The above examples are just a few of the beneficial scenarios that are possible using embodiments of the methods and systems of the present disclosure. The present disclosure greatly expands the scenarios and possibilities for viewing combined data from various sources in and associated with a process plant over various, disparate time intervals. The present disclosure thus results in greater efficiencies of time and productivity during the operation and administration of a process control plant. In addition to the method 200, the systems and methods discussed below demonstrate these and other advantages.

Figure 3:
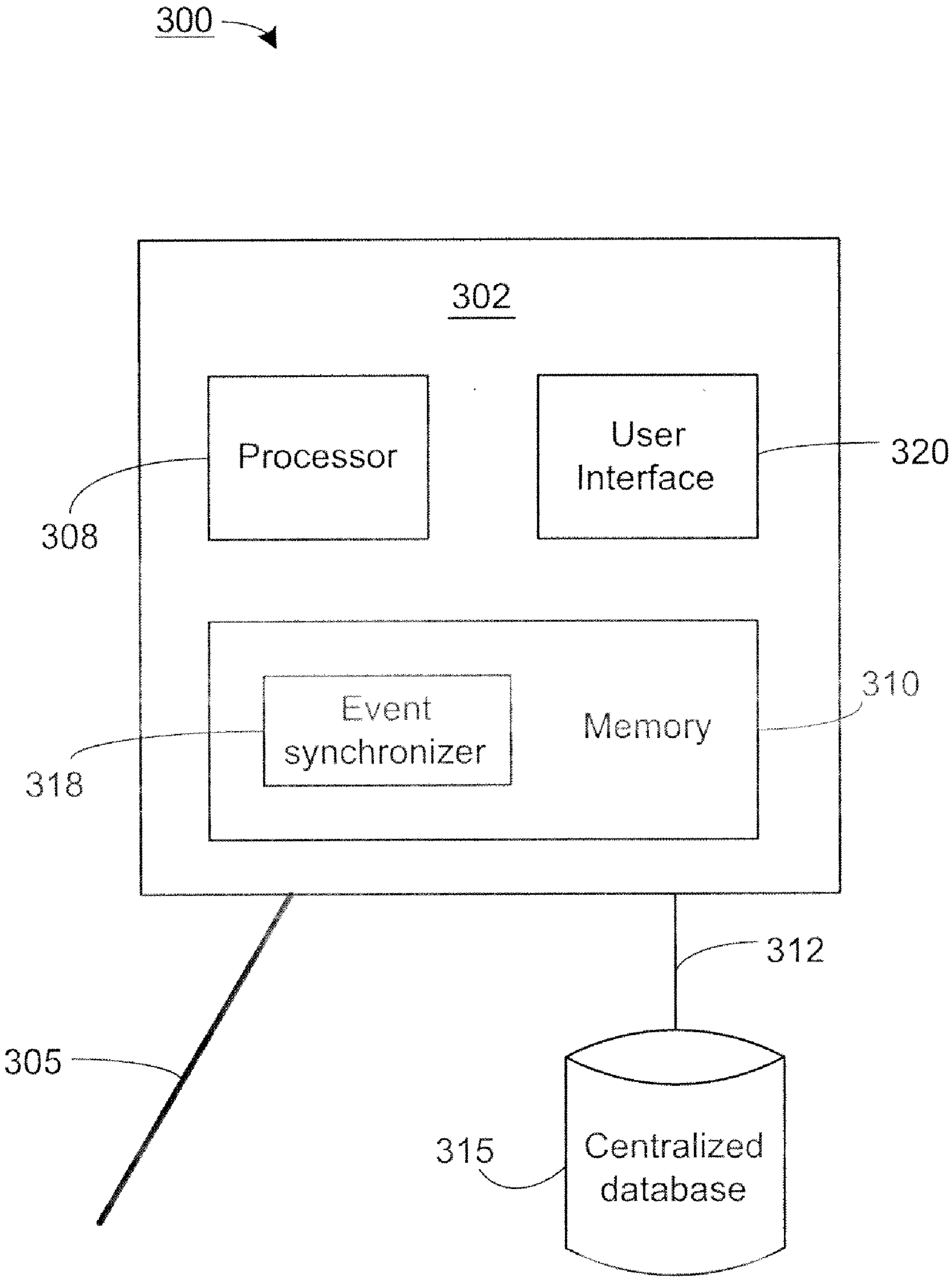
FIG. 3 depicts an embodiment of a system for reporting synchronized events in a process control system.

FIG. 3 depicts an embodiment of a system 300 for reporting synchronized events in a process control system. Embodiments of the system 300 may be incorporated into embodiments of the process control system and process control plant illustrated in FIG. 1, or may operate in conjunction with embodiments of the process control system and the plant 10 illustrated in FIG. 1. Embodiments of the system 300 may operate in accordance with embodiments of the method 200 illustrated in FIG. 2, if desired.

Embodiments of the event synchronized reporting system 300 may include a computing device 302 which may be, for example, the host or the operator workstations 20, 22 of FIG. 1. In some embodiments, the computing device 302 may not be a part of a process plant or process control system itself, but may be communicatively coupled to a computer of the process plant control system (e.g., the host or the operator workstations 20, 22 of FIG. 1) via a network link 305. The link 305 may be a direct or remote connection, and may be wired or wireless. The link 305 may provide a network connection to any public or private network. Generally, the network link 305 may be of any known networking technology known in the art.

The computing device 302 may have a processor 308 and a memory 310 accessible by the processor 308. Although the computing device 302 illustrated in FIG. 2 shows only one processor 308 and one memory 310, in some embodiments, the computing device 302 may have multiple processors 308 and/or multiple memories 310. Likewise, although the memory 310 is illustrated as being contained within the computing device 302, in some embodiments, the memory 310 may be located external to the computing device 302, but still may be remotely or locally accessible by the processor 308.

The computing device 302 may also be communicatively coupled, via a link 312, to a centralized process control system database 315, such as the database 28 of FIG. 1. In embodiments where the computing device 302 is an entity of a process control system, such as one of the workstations 20, 22 of FIG. 1, the computing device 302 may be coupled to the centralized process control database 315 via the data highway 24 of the system 10. In embodiments where the computing device 302 is not an entity of a process control plant but is communicatively coupled to a process control plant system, the computing device 302 may be coupled via the link 312 to an intermediate gateway (not shown) of the process control plant system 10 in order to communicate with the database 315 (e.g., in FIG. 1, communicate with the database 28 over the data highway 24). In some embodiments, the link 305 and the link 312 may be the same link, and in other embodiments, they may be different links.

The computing device 302 may encompass many different computing device configurations. For example, the computing device 302 may realized in hand-held devices, mobile phones, multi-processor systems, microprocessor-based or programmable consumer electronics, network PCs, minicomputers, mainframe computers, portable computing or communication devices, and or other computing devices capable of both visual display and direct or indirect communication with another computing device.

The computing device 302 may have an event synchronizer 318 stored in the memory 310. The event synchronizer 318 may be realized by computer-executable instructions, data structures, program modules, and other data that are executable and accessible by the processor 308. In a distributed computing environment, the computer-executable instructions, data structures, program modules, etc. of the event synchronizer 318 may be located in both local and remote memory storage devices, for example, in both a workstation 20, 22 of the process plant 10, and a computing device external to the process control plant system 10.

The event synchronizer 318 may obtain a synchronization parameter. Similar to the method 200, the synchronization parameter obtained by the event synchronizer 318 may be a parameter that may have multiple, non-contiguous instances of occurrence. In the present disclosure, not every instance of the synchronization parameter is required to be non-contiguous in time, however, at least two instances of occurrence are required to be non-contiguous in time relative to each other. As previously discussed, synchronization parameters may be, for example, a scheduled work shift, on-duty time intervals of a work group, on-duty time intervals of an individual, a period of time that an individual is logged on to one or more computers of the process control system, an execution time interval of a physical or logical entity in the process control plant, one or more batch runs of a certain type, a procedure or sub-unit of a batch run, and other such parameters occurring over multiple, non-contiguous time intervals in a process plant.

The synchronization parameter may be obtained, for example, by reading information stored in the memory 310 of the computing device 302, or it may be obtained from user input received via a user interface 320 of the computing device 302. In some embodiments, the synchronization parameter may be obtained by the event synchronizer 318 via the link 305 from a local or remote source, such as a local or remote database or computer, user input received via a website, or some other type of local or remote source.

For a first instance of occurrence of the synchronization parameter, the event synchronizer 318 may generate an event corresponding to the start time, and may generate another event corresponding to the end time. For a second instance of occurrence of the synchronization parameter that is non-contiguous in time with the first instance, a second start time event and a second end time event also may be generated. In some embodiments, instead of separate events for the start and end times, only one event may be generated to represent each specific instance of occurrence.

The event synchronizer 318 may record the generated events into the centralized database 315 of the process control system. The event synchronizer 318 may realize the recording via a direct write, via a sent message, or via some other means.

The event synchronizer 318 may generate an event synchronized report for the synchronization parameter. The event synchronized report may include at least one synchronized value based on the instances of occurrence for which events were recorded, and additionally based on historical process control data, from the process control system, associated with the time period of the one or more of the instances of occurrence. The at least one synchronized value may be, for example, an aggregate value, an average value, a total value, a percentage, and the like. In fact, any calculation or determination using the historical process control data obtained for the one or more instances of occurrence of the synchronization parameter may be used to produce the at least one synchronization value.

The historical process control data may be obtained by the event synchronizer 318 from the centralized database 315. Although centralized database 315 of the process control system is represented in FIG. 3 as a single database, reference 315 may represent more than one centralized database. For example, process control systems may include several databases in which process control data is recorded for historian purposes, such as a continuous history database, a discrete event database, and/or a batch historian database. The centralized database 315 may represent one or more historian databases used in a process control system. Thus, the event synchronizer 318 is enabled to consolidate data from multiple historian databases 315 within a process control system, and to integrate or synchronize the historical data with the instances of occurrence of the synchronization parameter in order to produce a meaningful, event synchronized report.

The generated event synchronized report may be stored, for example, in the memory 310 of the computing device 302, in the centralized database 315 of the process control system, or in some other local or remote memory. The generated report may be sent via the link 305 to another local or remote computer or computing device, another local or remote database, and/or to a printing device (not shown). The generated report may be displayed on the user interface 320.

The event synchronization reporting system 300 of FIG. 3 allows for many useful embodiments to support and enhance process control plant operations. With known art, process plant personnel would typically be forced to take multiple, manual steps to produce the information that is easily generated by the event synchronization reporting system 300. The event synchronization report system 300, however, may reduce this complexity. For example, the event synchronizer 318 may be in communication with a separate personnel shift scheduling application. When any personnel or time changes are made in the shift scheduling application, the event synchronizer 318 may automatically download these changes into the centralized database 315 of the process control system to automatically record events corresponding to planned shift changes. Using an embodiment of the system 300, shift changes may be automatically integrated between the personnel program and the process control database itself.

In another example of the system 300, a person responsible for profitability of the process plant may be able to use a website hosted by a server 302 to pull up various views related to the profitability of the plant. The website server 302 may include the event synchronizer 315, and may coordinate data from the centralized database in the process control system 54 and/or a personnel database at a different location in order to answer questions such as "What was the plant throughput during Team A's shifts?" or "How many times did Device Type B from Company C fail over the last year?" Other such benefits and advantages are also possible.

FIGS. 4A-4E illustrate one embodiment of a method of synchronizing work shift information in a process control system of a process control plant. In this embodiment, the method is demonstrated via a set of user interface screens illustrated by FIGS. 4A-4E. Of course, in other embodiments, not every step of the method requires a user interface screen as illustrated in this particular example. In other embodiments, some steps may not be manifested in separate user interface screens. In some embodiments, some steps may be combined onto a single user interface screen. FIGS. 4A-4E may be incorporated into and accessed by, for example, available tools in a process control system. Additionally, FIGS. 4A-4E may operate in accordance with the other systems and methods of the present disclosure.

Figure 4A:
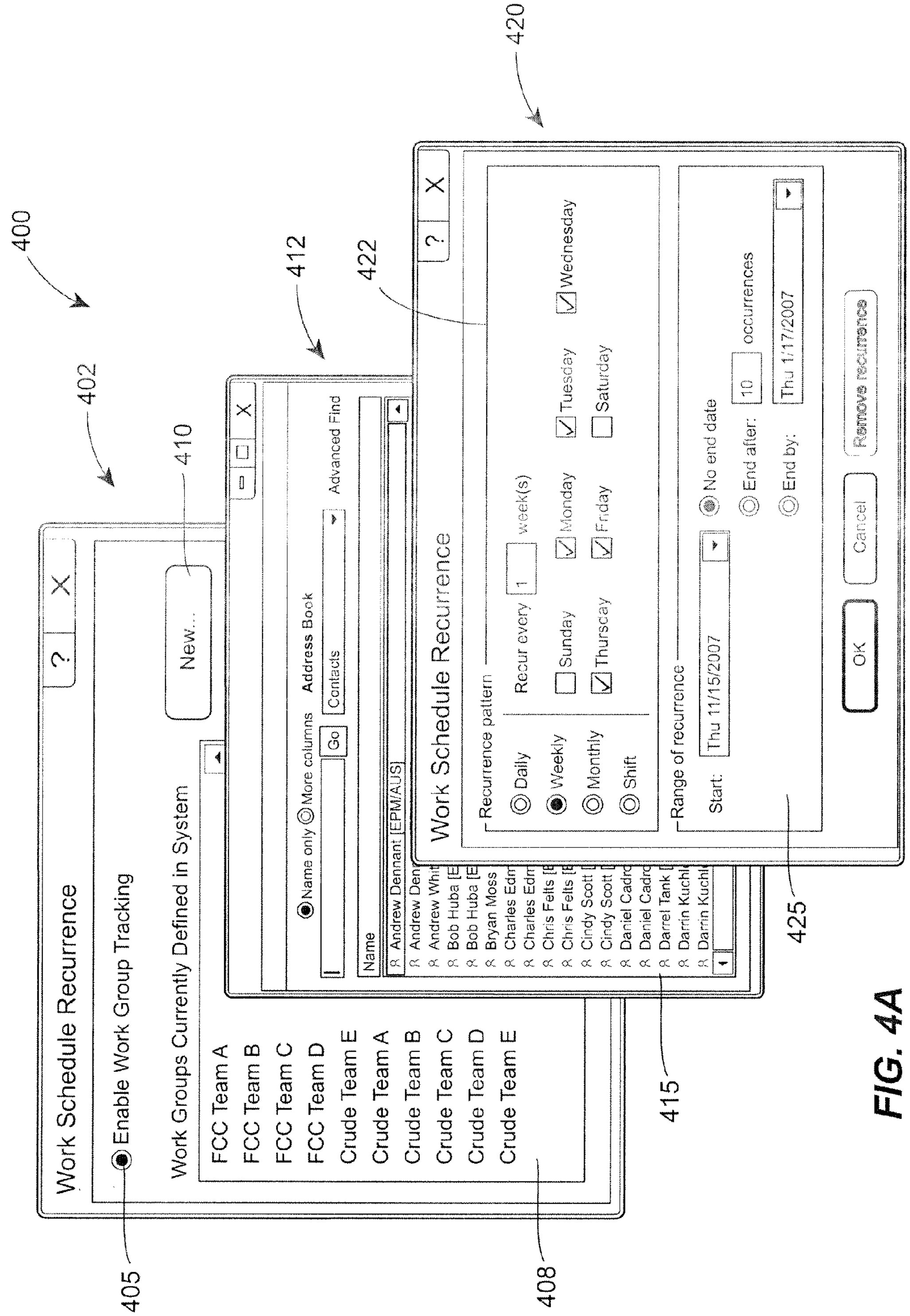
FIGS. 4A-4E illustrate an embodiment of synchronizing work shift information in a process control system of a process control plant as exemplified through a user interface.

FIG. 4A illustrates an embodiment 400 of identifying a work group in a process control plant. In this embodiment, a user interface screen 402 may be displayed to enable a user to define a work group. The user interface screen 402 may include a selector or user control 405 to enable work group tracking in the process control system, an area 408 on the screen 402 for indicating any work groups that have already been identified, and a selector or user control 410 for the user to indicate if he or she desires to identify any new work groups. Other selectors (not shown) may be possible including, for example, selectors to allow a user to disable work group tracking, and/or to modify or delete an identified work group. The screen 402 may be protected using a login/password or some other authentication mechanism so that only those users with appropriate authority may access and manipulate the information accessible via screen 402.

If the selector 410 for creating a new work group is clicked or otherwise selected, a child screen 412 may appear to allow the user to assign individuals to a work group. In this embodiment, access is provided by the child screen 412 to an employee database, contacts list or address book 415. The user may select individuals for the new work group from the contacts list or database 415, and the new work group may be saved in the process plant control system under a meaningful name or identifier. The contacts database, list or address book 415 may be local or remote. Exact configuration and user interface for the contacts database, list or address book 415 and mechanisms for searching and accessing entries therein are not germane to the present disclosure. In fact, the screen 412 may operate in conjunction with any known contact database format and access method. The newly created work group may be recorded into the process control system.

Another related screen 420 may allow a user to indicate a work schedule for the newly defined work group. The screen 420 may be accessible from the screen 402, the screen 412, both screens 402 and 412, and/or accessible via a separate menu. The screen 420 may provide a mechanism for a user to indicate a work schedule recurrence pattern 422 to which the work group is assigned, including, for example, a day, month, week, and/or shift assignment. The screen 420 may provide a mechanism for a user to indicate a time interval or range of reoccurrence 425 for the recurrence pattern 422. The screen 402 may include mechanisms to indicate regularly scheduled work times as well as irregularly scheduled work times. The actual boxes, data entry fields and user controls illustrated in screen 420 are exemplary only, and other screen display configurations are possible to enable a user to indicate the scheduled work times of a particular work group. The received schedule for the work group may be saved or recorded into the process control system.

Although the three screens 402, 412 and 420 are illustrated in FIG. 4A, any number of screens with any configuration or display of user interface controls (e.g., text entry, drop down windows, etc.) may be used to allow a user to identify a work group, the individuals in a work group, and a work schedule. In fact, in some embodiments, the identification of a work group, its individuals, and its work schedule may be partially or wholly obtained from a separate database, such as a personnel, human resource or other type of database. Such a database may be located locally or remotely with respect to the process control system, and may even be administered independently of the process control system itself. In these embodiments, the screens 402, 412 and 420 may merely indicate user controls that facilitate access to the data from the personnel, human resource, or other database.

Figure 4B:
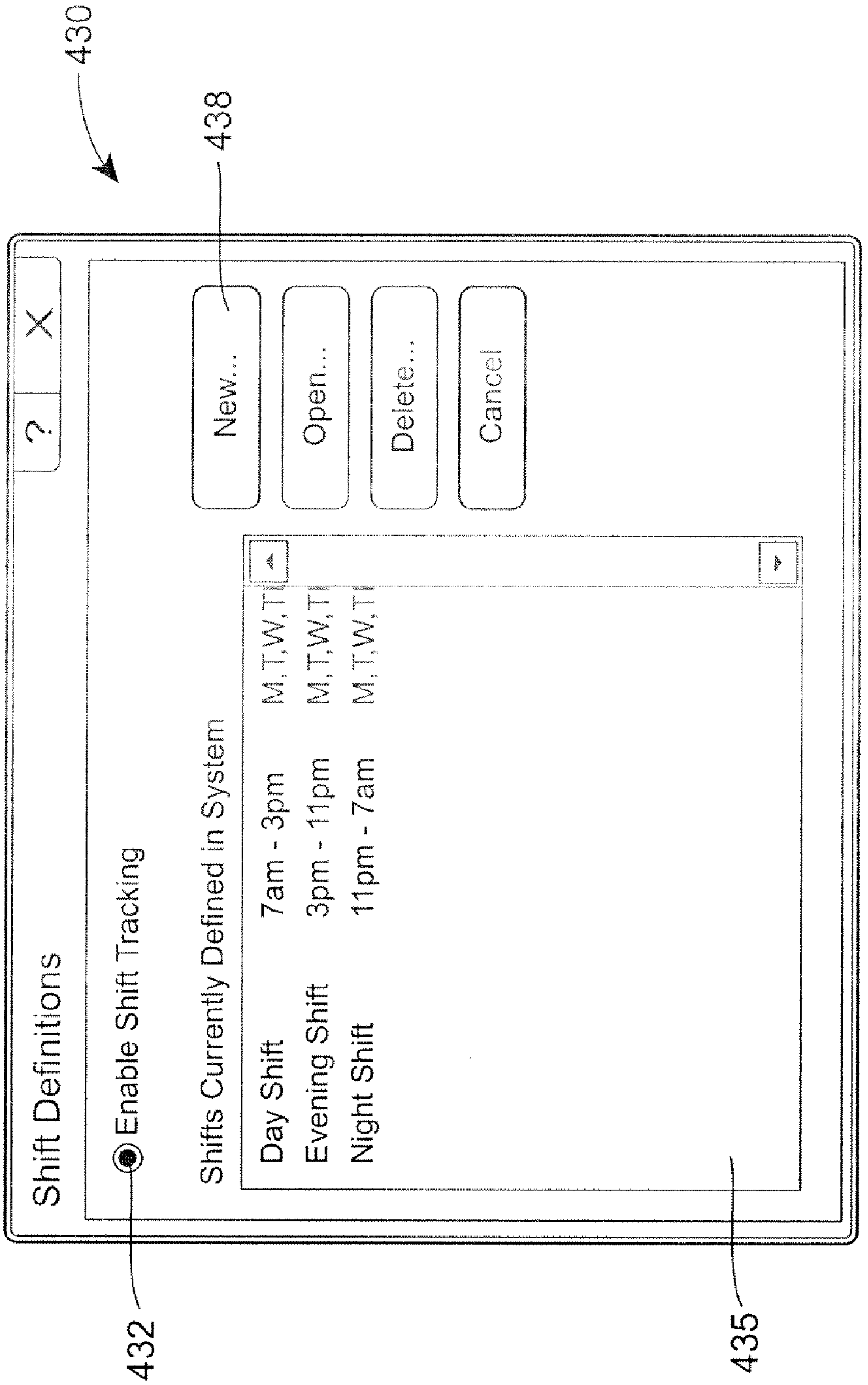

FIG. 4B illustrates one embodiment of a screen 430 for allowing a user to define work shifts. Work shifts may include, for example, a shift name or identifier, shift start and end times, times and days of the week or other time schedule. The screen 430 may include a selector or user control 432 to enable shift tracking in the process control system, an area 435 on the screen 430 indicating any shifts that have already been defined and/or default shifts, and a selector or user control 438 for the user to indicate if he or she desires to identify any new work shifts. Other selectors may be possible, for example, selectors to allow a user to disable work shift tracking, and/or to modify or delete an identified work shift. The screen 430 may be protected using a login/password or some other authentication mechanism so that only those users with appropriate authority may access and manipulate the information accessible via the screen 430. The defined shift may be stored or recorded into the process control system.

Similar to the screen 402 for work group definition, the screen 430 may, in some embodiments, allow a user to access a separate database to obtain previously defined work shift information. The screen 430 for work shift definition may be accessible from the screen 402 for work group definition, and vice versa.

Figure 4C:
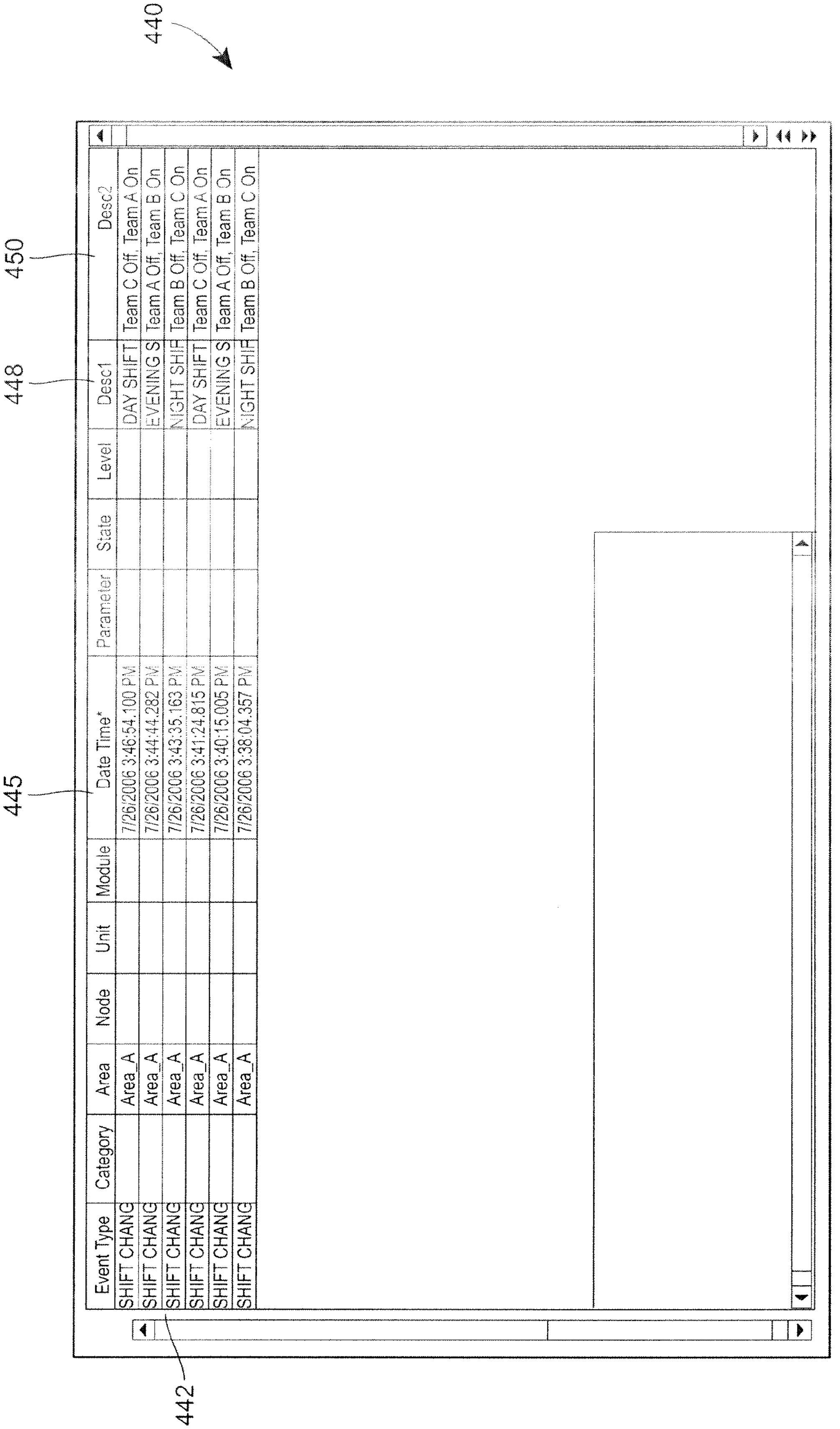

For each start and stop of a work shift and/or work group working period, a work change control system event may be generated. The work change events may be stored in an event historian database of the process control system. FIG. 4C illustrates an embodiment of a screen 440 that provides a snapshot of work change events as captured in an event historian database of a process control system. In the screen 440, each work change control system event may be identified by an event type 442. Each work change control system event may have a time stamp 445, and one or more description or tag fields 448, 450 may be associated with a work change event to provide additional information. In the example illustrated by the screen 440 of FIG. 4E, shift tracking and/or group tracking has been previously enabled (e.g., via the selector 405 of the screen 402 and/or the selector 432 of the screen 430). As a result of enablement, the description field 448 contains identifications of corresponding work shifts, and the description field 450 contains identifications of corresponding changes of on-duty work groups during a work shift. For example, the first entry on the screen 440 shows that at 3:46:54 pm on Jul. 26, 2006, Team A replaced Team C on the DAY SHIFT. Other information may also be captured and stored for each work change event.

Figure 4D:
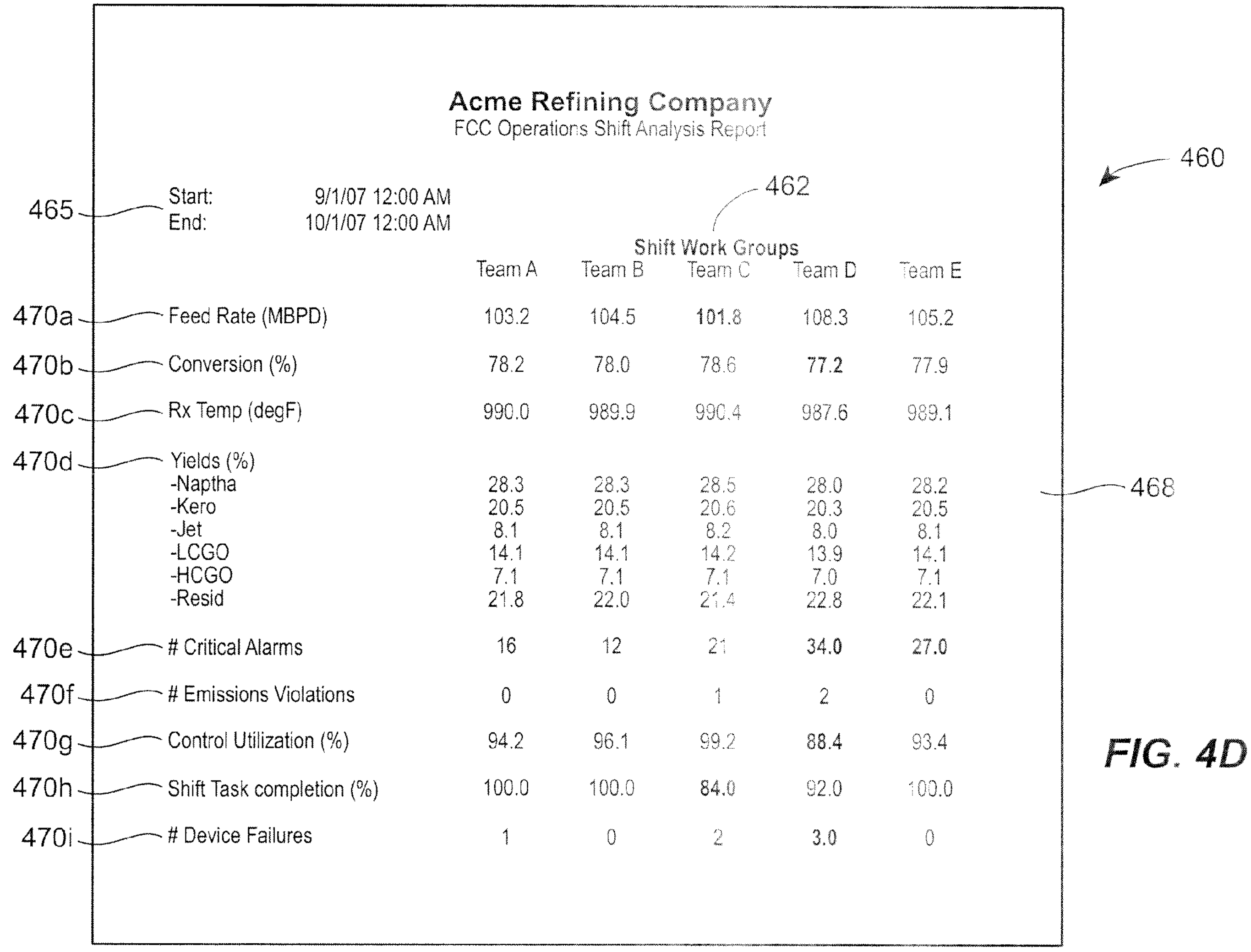

An event synchronized report may be generated using, for example, the event information stored for the historian of FIG. 4C. FIG. 4D illustrates an example of a generated event synchronized report 460 which contains a shift analysis across five different shift work groups 462 over a given specified time period 465. For each work group 462, a synchronized value 468 may be provided that may be based on both historical data for a process control entity in the process control plant as well as the specific work group on-duty periods during the specified time interval 465.

In the report 460, some synchronized values may be an average value over the time interval 465 for a specific work group (e.g., Feed Rate 470*a* and Rx Temp 470*c*). The report 460 illustrates, for instance, that Team C had an average feed rate 470*a* of 101.8 million barrels per day for the month of September, 2007 (reference 465).

Some synchronized values may be a percentage value over the time interval 465 for a specific work group (e.g., Conversion 470*b*, Yields 470*d*, Control Utilization 470*g*, and Shift Task Completion 470*h*). For instance, the report 460 shows that for the month of September 2007 (reference 465), Team A completed 100% of its shift tasks 470*h*.

Some synchronized values may be a total count over the time period 465 for a specific work group (e.g., Number of Critical Alarms 470*e*, Number of Emissions Violations 470*f*, and Number of Device Failures 470*i*). For instance, for the month of September 2007 (reference 465), the report 460 illustrates that two emissions violations 470*f* occurred while Team D was on duty.

The report 460 is exemplary only, and is not meant to imply any limitations on the types, the quantities, and/or the presentation format of the generated event synchronization report. Although the report 460 illustrates a tabular format, other formats may also be used, such as bar graphs, charts, text, pie charts, and other representations of data. A generated event synchronized report may include one or more work groups or synchronization parameters, and/or may include one or more synchronized values 468 corresponding to one or more process control entity identifiers (470*a-i*). A generated event synchronized report may not be limited to only reporting by work group, but may be generated for any type of work shift information pertaining to personnel, physical or logical working process control entities, batch run types, and the like. Work shift information may include, for example, a defined work shift, a defined work group (as exemplified in report 460), on-duty work intervals of an individual, a logged-on period of an individual at one or more computing devices of a process control system, a physical or logical execution time of a process control entity in a process control plant, a batch run of a certain type, and other such synchronization parameters that may occur in a process control plant over multiple, non-contiguous time intervals.

An event synchronized report generated by embodiments of the methods and systems of the present disclosure, such as report 460 of FIG. 4D, may be configured in the process control system to be automatically generated, for instance by a scheduling process of the process control system. Pre-defined or ad-hoc synchronized event reports may be scheduled and generated per a user's request. Additionally, a user may be able to manually request the generation of an event synchronized report at any time. A user may also be able to manually create a new event synchronized report at any time.

An event synchronized report such as report 460 of FIG. 4D may be generated for display on a user interface screen of the process control system, may be generated for display at another remote or local computer or computing device, or may be generated for storage at a remote or local database. Additionally, an event synchronized report may be generated and sent to another remote or local location, such as to a printer.

Figure 4E:
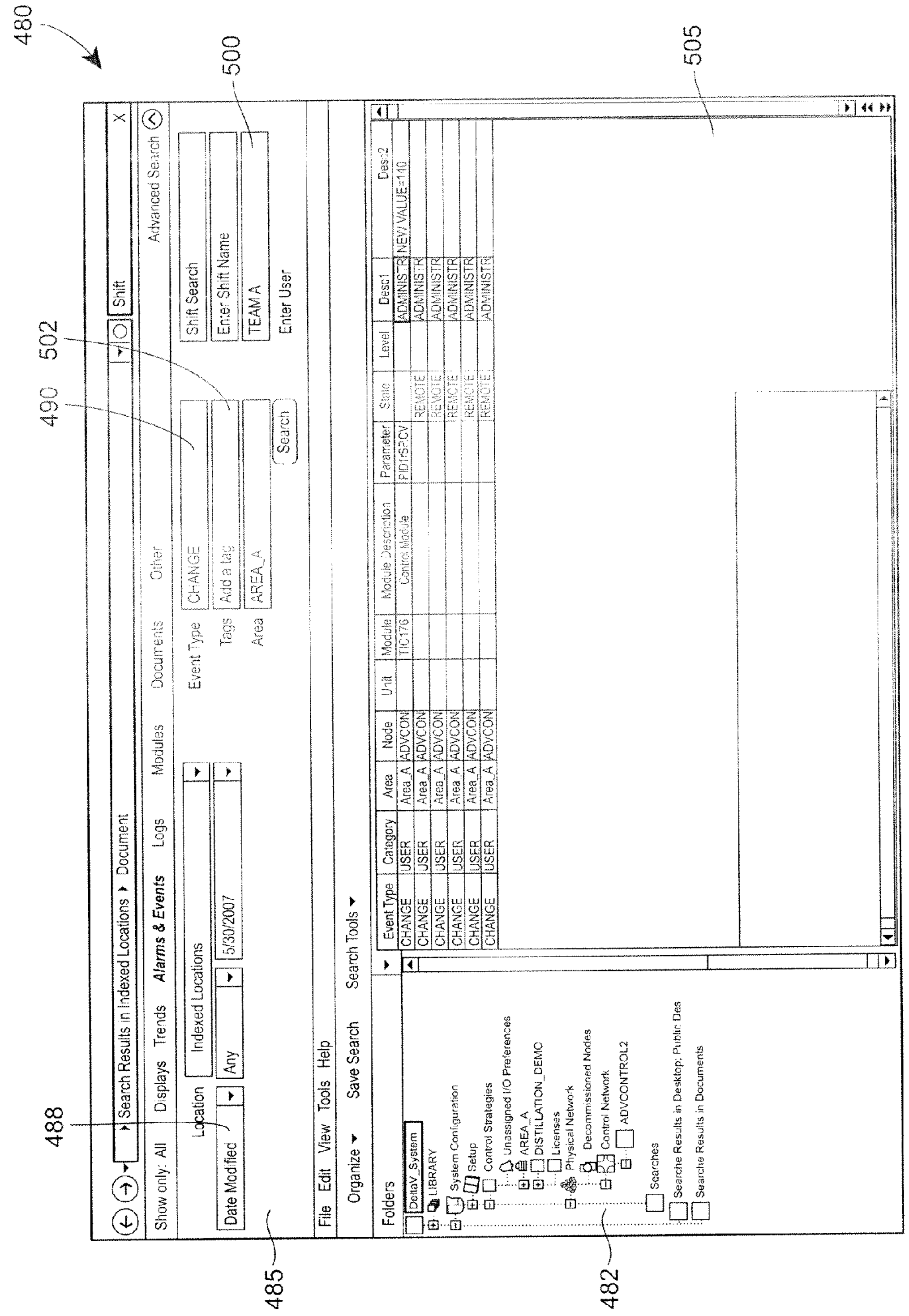

Turning now to FIG. 4E, embodiments of the methods and systems of the present disclosure may include a search application using synchronized event reporting. As previously discussed, the methods and systems of the present disclosure may generate work change control system events that may be recorded into a historian database of the process control system. These work change control system events may be easily searchable via process control system database search tools. FIG. 4E illustrates a snapshot of a user interface screen 480 for an embodiment of a search application using event synchronized reporting in a process control system.

In FIG. 4E, the screen 480 may include an available system folder view 482 of a process control system. The screen 480 may include a user entry area 485 that allows for searching the historian database by, for example, a date or other time period range 488, an event type 490, and/or a shift or other synchronization parameter 500. In this example, the event type 490 "CHANGE" indicates limiting the searching to only work change control system events. A tag 502 may be indicated to further limit the search space of work change control system events. Other searchable parameters currently available in a process control system may also be included in the user entry area 485, for example, an area of a process plant, a location, etc. The search results may be displayed on a results portion of the screen 505, and may have contents and/or format similar to the historian database snapshot screen 440 of FIG. 4C.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of reporting synchronized events in a process control system of a process plant, comprising:

collecting, by an event historian database in the process control system, events corresponding to process data generated by executing a control strategy to control an operation of a process in the process control system, the process control system having one or more process controllers executing one or more control modules in conjunction with one or more function blocks at the one or more field devices to perform a physical function in the process plant to perform executions of process control loops;

storing, in the event historian database, the collected events; and executing, by a processor of a computing device in communicative connection with the event historian database, computer executable instructions stored on the memory of the computing device to:

obtain, at the computing device of the process control system, a synchronization parameter, the synchronization parameter being a parameter of the process control system having instances of occurrence of a measurable time duration;

extract, by the computing device from the event historian database of the process control system, first data for a first event corresponding to the synchronization parameter, the first event occurring over a first time interval;

extract, by the computing device from the event historian database, second data for a second event corresponding to the synchronization parameter, the second event occurring over a second time interval and the first and the second time intervals are non-contiguous;

generate, by the computing device, a synchronized value based on the first and the second data; and generate, by the computing device, an event synchronized report for the synchronization parameter, the event synchronized report including the synchronized value.

2. The method of claim 1, wherein:

the events stored in the event historian database are historical discrete event process data;

the method further comprises obtaining, by the computing device, historical process control data for the first and the second time intervals from at least one of: historical continuous process data, the historical discrete event process data, or historical batch process data;

the synchronized value is based on the first data, the second data and the historical process control data; and the synchronized value is one of: an aggregate value, an average value, a percentage, or a total count.

3. The method of claim 2, wherein obtaining the historical process control data comprises obtaining the historical process control data from a centralized database of the process control system different from the event historian database.

4. The method of claim 1, wherein executing the computer executable instructions to obtain the synchronization parameter comprises executing computer executable instructions to obtain, as the synchronization parameter, at least one of: a work shift, a work group, an individual, or a logged-on time period of the individual.

5. The method of claim 4, wherein executing the computer executable instructions to obtain the synchronization parameter comprises executing computer executable instructions to obtain, as the synchronization parameter, at least one of: the work shift, the work group, the individual, the logged-on time period of the individual, an executing process control entity in the process control system, a run of a batch process type, or a procedure or sub-unit of a specific batch run.

6. The method of claim 1, further comprising generating a synchronization parameter event record in the event historian database corresponding to at least one of: a start time or a stop time of the synchronization parameter.

7. The method of claim 1, wherein executing the computer executable instructions to extract the first data comprises extracting a start time and a stop time of the first event, and wherein executing the computer executable instructions to extract the second data comprises extracting a start time and a stop time of the second event.

8. The method of claim 1, wherein executing the computer executable instructions to extract the second data for the second event comprises executing computer executable instructions to extract the second data for each of a plurality of events, and wherein a time interval of at least one of the each of the plurality of events is non-contiguous with the first time interval.

9. The method of claim 1, further comprising:

scheduling a generation of the event synchronized report, or generating the event synchronized report per a user request.

10. The method of claim 1, wherein:

executing the computer executable instructions to obtain the synchronization parameter comprises executing computer executable instructions to obtain a first synchronization parameter and a second synchronization parameter, executing the computer executable instructions to extract the first data for the first event corresponding to the synchronization parameter comprises executing computer executable instructions to extract first data for the first event corresponding to the first and the second synchronization parameters, executing the computer executable instructions to extract the second data for the second event corresponding to the synchronization parameter comprises executing computer executable instructions to extract second data for the second event corresponding to the first and the second synchronization parameters, and executing the computer executable instructions to generate the event synchronized report for the synchronization parameter comprises executing computer executable instructions to generate the event synchronized report for the first and the second synchronization parameters.

11. An event synchronized reporting system for use in a process control plant having a process control system, the event synchronized reporting system comprising:

a computer having a processor and a memory;

a historian database accessible by the computer, the historian database storing process data generated by executions of process control loops within the process control system, the process control system having one or more process controllers connected to one or more field devices, the one or more process controllers executing one or more control modules in conjunction with one or more function blocks at the one or more field devices to perform a physical function in the process plant to perform the executions of the process control loops; and an event synchronizer stored on the memory of the computer and adapted to be executed on the processor, wherein the event synchronizer is adapted to:

obtain a synchronization parameter, the synchronization parameter being a parameter of the process control system having instances of occurrence of a measurable time duration, wherein a first instance of occurrence of the synchronization parameter and a second instance of occurrence of the synchronization parameter are non-contiguous over time;

generate a first event corresponding to at least one of a start time and an end time of the first instance;

generate a second event corresponding to at least one of a start time and an end time of the second instance;

record the first and the second events in the historian database; and generate an event synchronized report for the synchronization parameter, the event synchronized report including at least one synchronized value based on:

data associated with the first event, data associated with the second event, and historical data corresponding to a particular process control entity included in executing a control strategy to control an operation of a process in the process control plant, the historical data generated by the process control plant during at least one of the first or the second instance of occurrence of the synchronization parameter, and the historical data stored in the historian database.

12. The event synchronized reporting system of claim 11, further comprising the computer further having a user interface, and wherein the event synchronizer is adapted to at least one of:

obtain the synchronization parameter via the user interface, obtain the start and end times of the first and second instances via the user interface, or obtain a report time interval for the event synchronized report, wherein at least a portion of the first instance and at least a portion of the second instance each occur during the report time interval.

13. The event synchronized reporting system of claim 11, wherein the event synchronizer is further adapted to generate the event synchronized report including the at least one synchronized value, wherein the at least one synchronized value is one of: an aggregate value, an average value, a percentage, or a total value.

14. The event synchronized reporting system of claim 11, wherein the synchronization parameter comprises a work group, a work shift, an individual, or a logged-on time of the individual.

15. The event synchronized reporting system of claim 14, wherein the synchronization parameter further comprises an executing process control entity in the process control plant, a batch run type, or a procedure or sub-unit of a specific batch run.

16. The event synchronized reporting system of claim 15, wherein the executing process control entity comprises one of: a physical process control entity, a logical process control entity, or an alarm.

17. The event synchronized reporting system of claim 11, wherein the event synchronizer is adapted to:

obtain more than one synchronization parameter; and generate an event synchronized report for the more than one synchronization parameter, wherein the at least one synchronized value is based on data associated with the first and second events of the more than one synchronization parameter and the historical data corresponding to the process control entity.

18. The event synchronized reporting system of claim 11, wherein the event synchronizer is adapted to obtain, from at least one other database accessible by the computer, at least one of:

the synchronization parameter, the start and end times of the first and second instances of occurrence of the synchronization parameter, or a report time interval for the event synchronized report, wherein at least a portion of the first instance and at least a portion of the second instance each occur during the report time interval.

19. The event synchronized reporting system of claim 11, wherein the historical data corresponding to the process control entity is obtained from a different centralized database than the historian database.

20. The event synchronized reporting system of claim 19, wherein the different centralized database is one of: a continuous process historian database, a discrete event historian database, or a batch historian database.

* * * * *

UNITED STATES PATENT AND TRADEMARK OFFICE

CERTIFICATE OF CORRECTION

PATENT NO. : 8,326,666 B2
APPLICATION NO. : 12/240948
DATED : December 4, 2012
INVENTOR(S) : John M. Caldwell et al.

It is certified that error appears in the above-identified patent and that said Letters Patent is hereby corrected as shown below:

In the Specification:

At Column 1, line 65, "with" should be -- wish --.

At Column 1, line 66, "with" should be -- wish --.

At Column 3, line 58, "occuring" should be -- occurring --.

At Column 8, line 61, "an discrete" should be -- a discrete --.

At Column 11, line 23, "with" should be -- wish --.

Signed and Sealed this
Ninth Day of December, 2014

Michelle K. Lee
*Deputy Director of the United States Patent and Trademark Office*